US006321228B1

(12) United States Patent
Crandall et al.

(10) Patent No.: US 6,321,228 B1
(45) Date of Patent: Nov. 20, 2001

(54) INTERNET SEARCH SYSTEM FOR RETRIEVING SELECTED RESULTS FROM A PREVIOUS SEARCH

(75) Inventors: Aaron Clyde Crandall; Jason Wayne Bosarge; Louis Hernandez, all of Boise, ID (US)

(73) Assignee: PowerCast Media, Inc., Horsham, PA (US)

( * ) Notice: Subject to any disclaimer, the term of this patent is extended or adjusted under 35 U.S.C. 154(b) by 0 days.

(21) Appl. No.: 09/386,352

(22) Filed: Aug. 31, 1999

(51) Int. Cl.[7] .................................................. G06F 17/30
(52) U.S. Cl. ................................... 707/10; 707/2; 707/6; 707/513; 709/218
(58) Field of Search .............................. 707/2–6, 10, 1–3, 707/104, 501, 513; 709/200–203, 217–219

(56) References Cited

U.S. PATENT DOCUMENTS

| | | | |
|---|---|---|---|
| 5,761,436 | 6/1998 | Nielsen | 395/200.75 |
| 5,852,820 | * 12/1998 | Burrows | 707/2 |
| 5,870,737 | * 2/1999 | Dockter et al. | 707/4 |
| 5,920,859 | * 7/1999 | Li | 707/5 |
| 5,924,105 | * 7/1999 | Punch, III et al. | 707/513 |
| 5,926,807 | 7/1999 | Peltonen et al. | 707/3 |
| 5,940,831 | * 8/1999 | Takano | 707/10 |
| 5,941,944 | * 8/1999 | Messerly | 709/203 |
| 6,018,342 | * 1/2000 | Bristor | 345/354 |
| 6,100,890 | * 8/2000 | Bates et al. | 345/357 |
| 6,125,361 | * 9/2000 | Chakrabarti et al. | 707/3 |

FOREIGN PATENT DOCUMENTS

WO 96/23265 * 8/1996 (WO) .................................... 17/30

* cited by examiner

*Primary Examiner*—Hosain T. Alam
(74) *Attorney, Agent, or Firm*—Fliesler Dubb Meyer & Lovejoy LLP

(57) ABSTRACT

A system and method that enable Internet users to access selected records retrieved from result sets that are derived from earlier search queries. The invention tracks and ranks selected records that users deemed valuable to a search query. When an Internet user submits a search query, the system creates three distinct but related queries for searching all accessible web sites, a collection database. and a rank database. The collection database includes a list of collections, i.e., records that other users deem relevant to a search topic and that are selected from result sets derived with earlier search queries; the collection is organized in a folder/file based hierarchical format. The rank database includes Uniform Resource Locators (URLs) for identifying, web sites that are bookmarked by other users. Each record in the collection and rank databases has an associated score that is used to organize records retrieved from those databases. Thus, when the user submits a search query to the system, it returns selected records from the collection and rank databases, in addition to other related web sites from the Internet.

28 Claims, 9 Drawing Sheets

Application Layer / Layer 5
202

Transport Layer / Layer 4
204

Internet Layer / Layer 3
206

Network Interface Layer / Layer 2
208

Physical Layer / Layer 1
210

TCP/IP Layering Model

FIG. 2

```
    402  402   402    402 402  402
Recipe for chocolate chip ice cream
               400
```

FIG. 4-A

Apple -computer delicious

FIG. 4-B

Apple and "Red Delicious" and "Washington State"

FIG. 4-C

Collection - 1
    John Doe Favorites    ~ 602 (folder)
    Computer Gaming Sites  ~ 604 (folder)
    On-line News Sites    ~ 606 (folder)
    Telephones.doc        ~ 608
    Camera.txt            ~ 610
    On-line Brokage Sites   ~ 612 (folder)

Collection - Computer Gaming Sites ~ 604
    Arcade                 (folder)
    Action                  (folder)
    Cheat List.doc

FIG. 6

| URL | TITLE | COLLECTION PLACEMENT | KEYWORDS | DESCRIPTION | TIME FIELDS |
|---|---|---|---|---|---|
| www.washingtonpost.com | Washington Post Home Page | 602, 606 | News, Weather, Washington, Politics | Washington Post On-line | P1 P2 P3 P4 P5 P6 |
| www.patent.ibm.com | IBM Intellectual Property Network | 602 | Patents, Products, Search | Search Tool for Patents | P1 P2 P3 P4 P5 P6 |
| ... | | | | | |

FIG. 7

INTERNET SEARCH SYSTEM FOR RETRIEVING SELECTED RESULTS FROM A PREVIOUS SEARCH

FIELD OF THE INVENTION

This invention relates to a computer search system and more particularly to a search system and method in a computer network for sharing and ranking retrieved preselected records that are organized in a hierarchical format.

BACKGROUND OF THE INVENTION

Advances in computer processing power and network communications have made information from a wide variety sources available to users on computer networks. Computer networking allows network computer users to share information, software applications and hardware devices and internetworking enables a set of physical networks to be connected into a single network Such as the Internet. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual. graphical, audio. and animation information. Currently, Internet users retrieve information from the Internet, through the Web, by 'visiting' a web site on a computer that is connected to the Internet. The web site is, in general terms, a server application that displays information stored on a network server computer. The web site accepts connections from client programs, such as Internet browsers, and the client programs allow Internet users to access information displayed on the web site. As the number of physical networks connected to the Internet continue to grow, so too will the number of web sites that are accessible to Internet users.

Presently, the only practical way to search the Internet for web sites that are related to a specific topic is to use an Internet search program or engine, such as AltaVista™ or Yahoo™.

In order to use a search engine to search for web sites related to a specific topic, the Internet user submits a search query containing search terms to a software program on a network server computer. The software program executes the search program to retrieve web sites that are related to the specified topic and to store the retrieved web sites in a result set. Search programs typically search all accessible web sites and index and rank retrieved web sites. While search engines typically implement different search techniques for indexing and ranking retrieved web sites, a common technique is for the search engine to count the number of times a search term appears on a web site. Some search engines also consider how often the search term appears in the beginning of a document because documents with search terms in the beginning are more likely to be relevant to the search topic.

Based on the search topic and the number of retrieved web sites, the user may be required to scan through thousands, if not hundreds of thousands, of records in the result set. Moreover, the user may be required to 'click' hyperlinks in each record and wait for the web site associated with the hyperlink to display its contents. It is only after the web site's contents are displayed and examined by the user that the user can determine if the web site is relevant to the information sought. Often, this can be a slow process and users may have to go to a lot of immaterial web sites in order to find relevant web sites. Additionally, the user has no way of determining if another user has performed a search on the same topic and no way of sharing already conducted search and research quickly and easily with other Internet users via an Internet search engine.

SUMMARY OF THE INVENTION

The present invention relates to a system and method that enable Internet users to access selected records retrieved from result sets that are derived from earlier search queries. The invention tracks and ranks selected records that users deemed valuable to a search query. When an Internet user submits a search query, the system creates three distinct but related queries for searching all accessible web sites, a collection database and a rank database. The collection database includes a list of collections, i.e., records that other users deem relevant to a search topic and that are selected from result sets derived with earlier search queries; the collection is organized in a folder/file based hierarchical format. The rank database includes uniform Resource Locators (URLs) for identifying web sites that are bookmarked by other users. Each record in the collection and rank databases has an associated score that is used to organize records retrieved from those databases. Thus, when the user submits a search query to the system, it returns selected records from the collection and rank databases, in addition to other related web sites from the Internet.

Specifically, when a user performs a search on a precise topic, the user selects records consisting of URLs and/or other data, such as files and images, from the retrieved result set, and organizes the selected records in a collection. Collection records containing bookmarks of URLs may also come from other sources, such as web sites that are manually bookmarked by the user or bookmarks that are uploaded through a computer browser. The user may share the collection with other Internet users by designating it as a public collection and submitting it for approval. When a collection is approved, it is assigned a URL, several related keywords, and a description. It is then cleared to show up as a shared resource. Public collections are searchable by search engines and viewable by other users. Hence, other Internet users performing the same search may benefit from the research of the collection's creator. This system saves time in that other Internet users may not have to scan through unrelated records in a result set in order to locate pertinent web sites and/or information.

It is therefore an object of the present invention to provide a system that combines records retrieved from the three distinct queries into a result set and sorts the records in the result set. The system assigns separate scores to the three queries in order to sort records in the result set that were retrieved through the respective queries. The system also assigns separate scores to each record in the sorted result set to further determine the relevancy of each record to the search query. The system increases the score associated with each record each time a search term occurs in the record and based on the location of the search term in the record. The system may further sort the result set based on the user s sorting choice.

It is another object of the invention to use the first distinct query to locate records containing a phrase made up of all terms in the search query, but excluding a first special character or Boolean term. The system uses the second distinct query to locate records containing all terms in the search query and it uses the third distinct query to locate records containing any search term or variation of the search term.

It is another object of the invention to allow the user to bookmark web pages that contain relevant information, to store URL records corresponding to the bookmark web page in the rank database, and to track and rank the URL records based on the bookmarking activity on the associated web site.

It is another object of the invention to track and rank URL records associated with bookmarked web pages by assigning a score to each URL record and maintaining the assigned score. The system periodically recalculates scores assigned to each URL record in order to prevent the earliest created records from always having the highest scores. The system also utilizes fields in the URL record in a predefined formula in order to periodically recalculate the score associated with each record in the rank database.

It is a further object of the invention to maintain keywords for describing the bookmarked web page in the URL, record, assigning a score to each keyword, and selecting the highest scoring keywords.

Additional features and advantages of the invention will be set forth in the description that follows, and in part will be apparent from the description. or may be learned by practice of the invention. The objectives and advantages of the invention will be realized and attained by the system particularly pointed out in the written description and claims hereof as well as the appended drawings.

To achieve these and other advantages and in accordance with the purpose of the invention, as embodied and broadly described, the present invention provides a system connected to an expanded network, said system comprising a user interface for entering a search query that is submitted to a search engine; conversion means in the search engine for converting the search query into a first query, a second query and a third query; means in the search engine for searching the expanded network, a first database and a second database with the first, second and third queries in order to retrieve web sites and previously selected records that are related to a specific topic and for retrieving a Uniform Resource Locators(URL) associated with a respective bookmarked web sites; means in the search engine for combining records retrieved from the search in a result set, and sorting the result set.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the TCP/IP Layering Model Protocol used during communications between components on the computer network;

FIG. 4-A illustrates a search query;

FIG. 4-B illustrates a search query that includes special characters;

FIG. 4-C illustrates a search query that includes Boolean characters;

FIG. 6 illustrates the bookmark hierarchical tree structure according to a preferred embodiment of the invention;

FIG. 7 illustrates a URL record that is stored in a collection database and a rank database according to a preferred embodiment of the invention;

DETAILED DESCRIPTION

Reference will now be made in detail to the preferred embodiments of the present invention, examples of which are illustrated in the accompanying drawings. The present invention described below extends the functionality of the inventive search and rank system and methods for utilizing the system.

Figure 1:
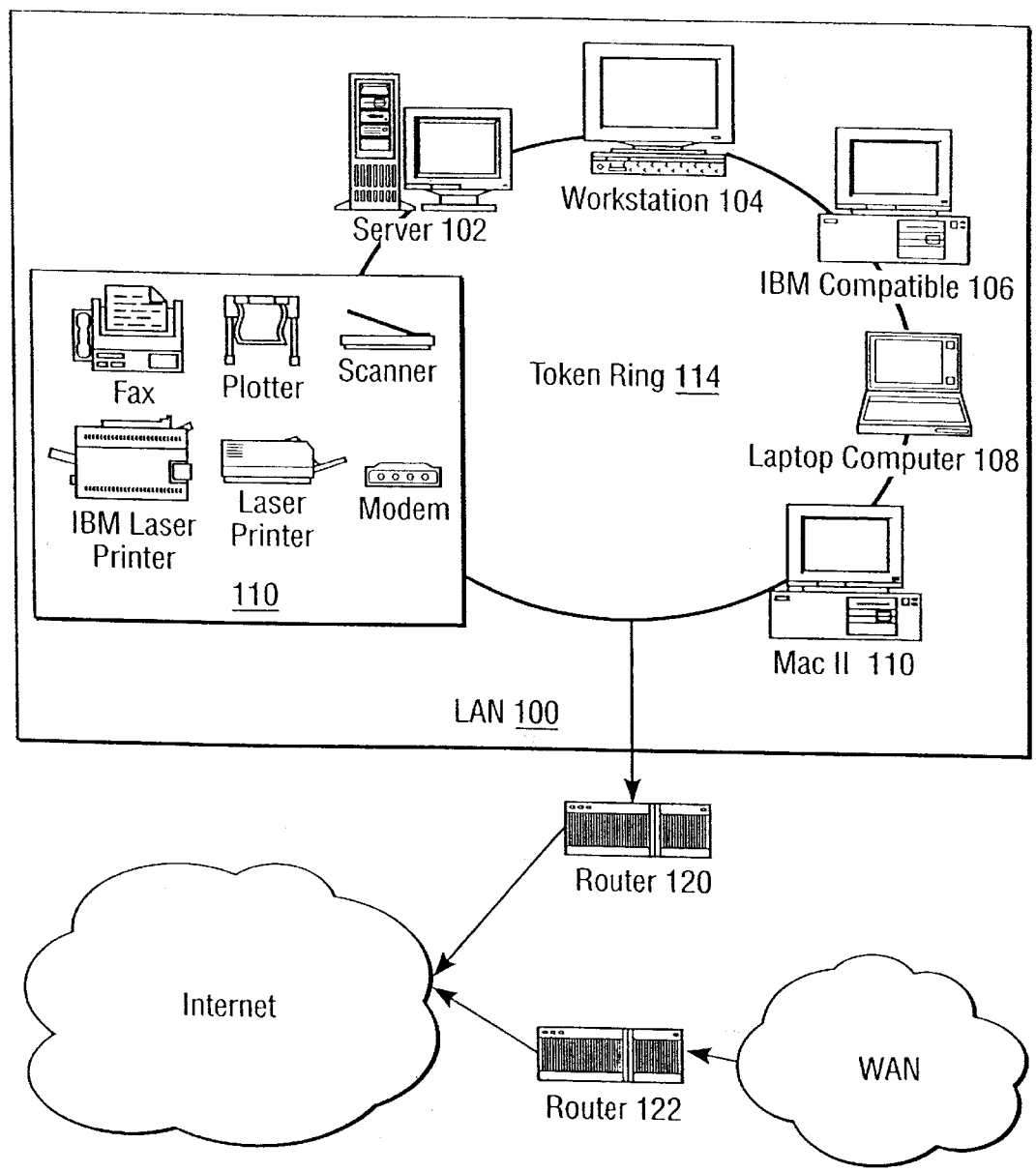
FIG. 1 illustrates the computer network in which the inventive search and rank system may be incorporated.

FIG. 1 is an example of a local area network (LAN) 100 that is configured to transmit information to components inside and outside of LAN 100. It comprises a server 102, four computer systems 104–110, and peripherals, such as printers and other devices 112, that may be shared by components on LAN 100. Computer systems 104–110 may serve as clients for server 102 and/or as clients and/or servers for each other and/or for other components connected to LAN 100. Components on LAN 100 are preferably connected together by cable media, for example copper or fiber-optic cable, and the network typology may be a token ring topology 114. It should be apparent to those of ordinary skill in the art that other media, for example, wireless media, such as optical and radio frequency, may also connect LAN 100 components. It also should be apparent that other network topologies, such as Ethernet, may be used.

Data may be transferred between components on LAN 100 in packets, i.e., blocks of data that are individually transmitted over LAN 100. Routers 120, 122 create an expanded network by connecting LAN 100 to other computer networks, such as the Internet. other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to a standard protocol. Computer networks connected to the Internet and to other networks typically use TCP/IP Layering Model Protocol. It should be noted that other internetworking protocols may be used.

As illustrated in FIG. 2, TCP/IP layering Model comprises an application layer or (Layer 5) 202, a transport layer or (Layer 4) 204, an Internet layer or (Layer 3) 206, a network interface layer or (Layer 2) 208, and a physical layer or (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network; and physical layer protocols 210 correspond to the basic network hardware. By using TCP/IP Layering model protocols, any component connected to the network can communicate with any other component connected directly or indirectly to the one of the attached networks.

Figure 3:
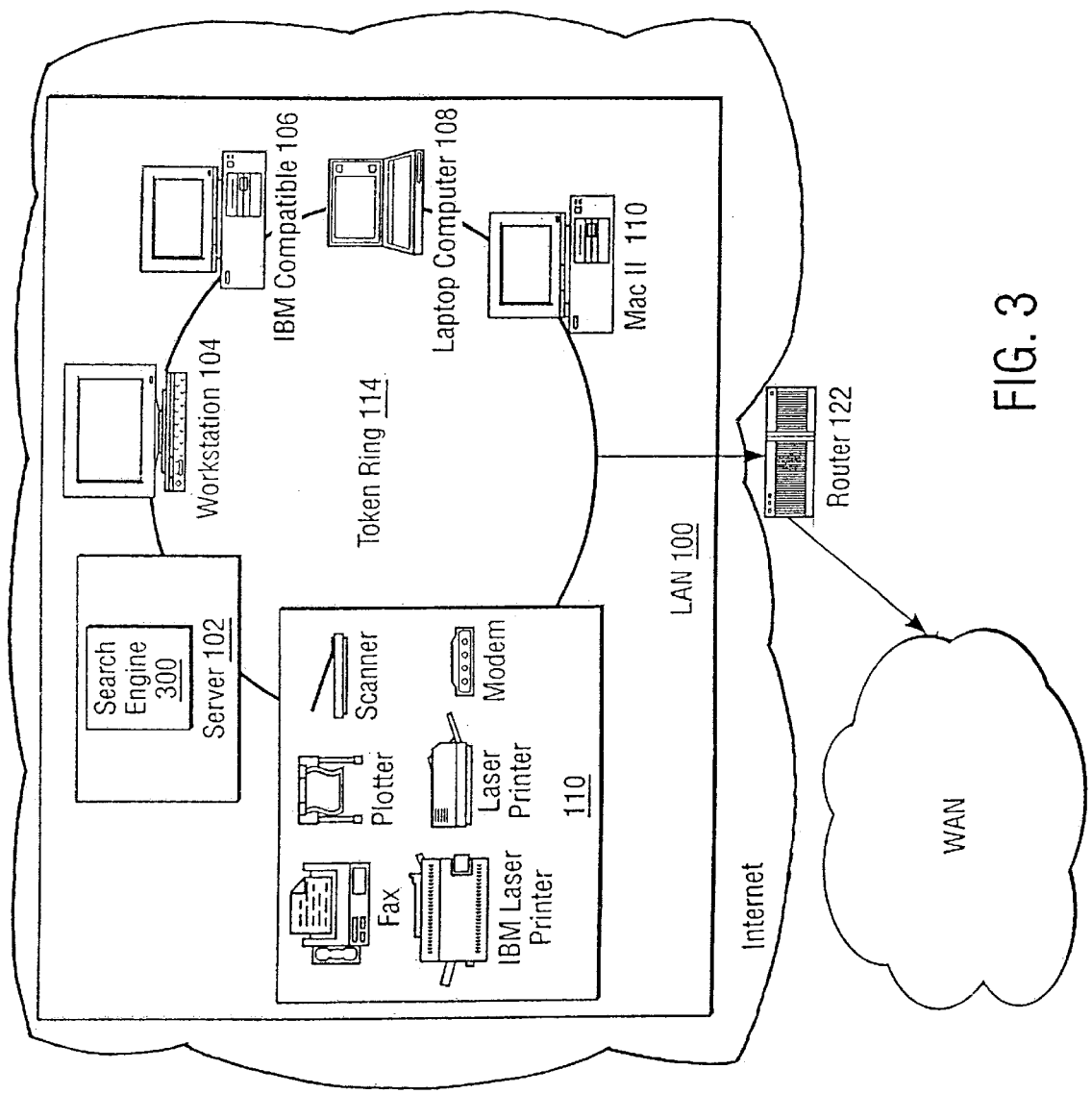
FIG. 3 illustrates a preferred embodiment of the search system that is used to search for web sites related to a particular topic.

Presently, an Internet user may log on the Internet through server 102 and a browser application program, such as Microsoft Explorer™ or Netscape™ browser, on client computer system 104–110. The browser displays text and/or graphic information on Web pages through the client computer system 104–110 screen and permits the user to navigate through the Web using a mouse. Furthermore, some of the Web page information may be highlighted to indicate that an item is a hypertext, or pointer to another document. FIG. 3 illustrates an inventive search engine 300 that is used to search for web sites related to a particular topic. Search engine 300 is preferably executed on server 102 although it may be executed on client computer system 104–110. The user may access search engine 300 through the browser and submit a search query related to a specific topic to it.

FIG. 4-A illustrates a search query 400 that may be submitted to a currently used search engine, such as AltaVista™ search engine. Search query 400 includes multiple query terms 402. The user may modify search query 400 with special characters, such as a plus sign, '+', a minus sign, '−' and left and right parenthesis, '()', and with Boolean terms such as 'AND', 'OR', and 'AND NOT'. For example, when the user enters several query terms 402 in a search query. AltaVista™ search engine searches for pages containing at least one of those query terms. Adding a plus sign, '+', before a query term 402 ensures that the query term 402 will appear on every page the AltaVista™ search engine returns. If the minus sign, '−', precedes query term 402, the search engine will only retrieve records that do not contain the query term. The user may also search for exact phrases by enclosing search terms in quotation marks. FIG. 4-B illustrates a search query that includes special characters and FIG. 4-C illustrates a search query that includes Boolean characters. It should be apparent that other modifications may be made to search query 400.

Figure 5:
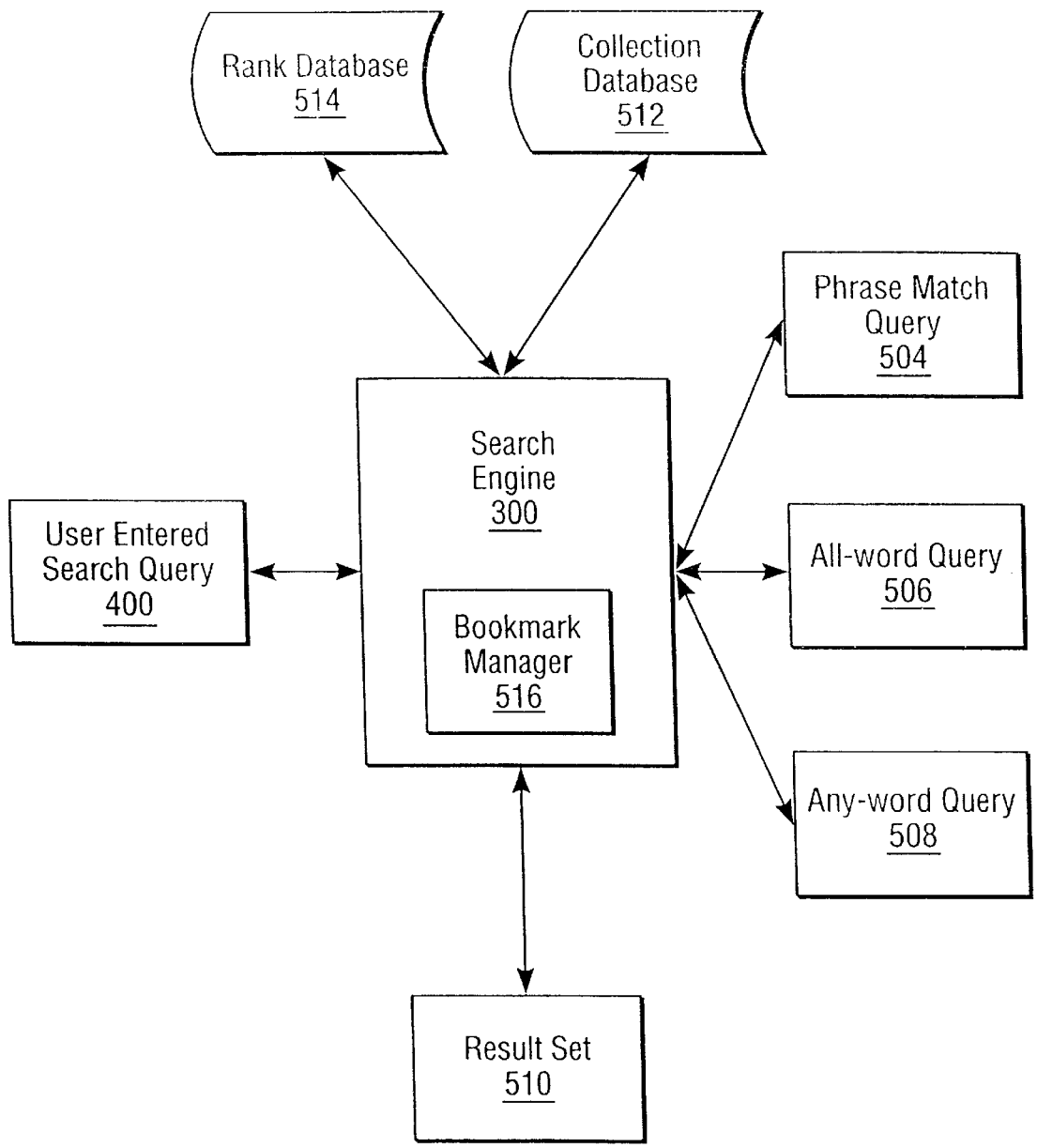
FIG. 5 illustrates how the search engine converts a single search query into three different queries according to a preferred embodiment of the invention.

FIG. 5 illustrates how search engine 300 in the inventive system processes search query 400. Specifically in a preferred embodiment of the invention, search engine 300 converts search query 400 into a phrase match query 504, an all-word query 506, and an any-word query 508. These queries may be turned off and on based on search requirements. Phrase match query 504 is used for locating records containing a phrase made up of all query terms 402, but excluding the first special character or Boolean term. Search engine 300 uses all-word query 506 to locate records containing all search terms 402 and it uses any-word query 508 to search for records containing any search terms 402 entered by the user and to search for records that contain a variation of each search term 402. For example, if the user entered 'record' as a search term, any-word query 508 will retrieve records containing 'record', 'records', 'recording', and 'recorded'. During the query conversion, if search engine 300 determines that multiple queries 504–508 will produce identical results, then only one of the queries is used. Upon executing queries 504–508, search engine 300 also eliminates duplicate records retrieved by multiple queries.

After queries 504–508 are constructed, search engine 300 searches a collection database 512 and a rank database 514 for any records that satisfy the queries. Collection database 512 contains 'collections,' which is a user created folder based on hierarchical format. Each collection contains organized and pre-selected records, related to a specific topic, that are derived from earlier searches. Rank database 514 contains searchable URL records that are associated with bookmarked web pages. During collection database 512 search, search engine 300 associates a score with each query 504–508 in order to determine the precedence of records retrieved from each query. Query scores may be modified to vary the priority of records retrieved by each query 504–508. Records retrieved from queries 504–508 are combined into one result set 510 and they are sorted according to their associated scores. Result set 510 is typically truncated at a predetermined number to limit the number of records that are transmitted to the user. A record score is associated with each record in result set 510 for further determining the relevancy of each record to the search term entered by the user. Search engine 300 increases a record's score each time a search term occurs in the record and based on the location of the search term in the record. Thereafter, the entire result set 510 is sorted according to the user's sorting choice. Examples of sorting based on the user's choice include sorting based on the record's score; sorting based on the record's creation date; sorting based on the record activity level; sorting based on the rating assigned to each record by other users; sorting based on the late updated date of each record; and sorting based on the number of URL,s links associated with each record. After sorting result set 510, it is displayed on the web page for the user to examine.

In the inventive system, the user may also bookmark each web page, in result set 510, that contains relevant information. Moreover, the user may use tools in the inventive system to bookmark pages found through other search engines. The URLs associated with the bookmarked web pages are organized into a hierarchical tree structure similar to a computer file structure. FIG. 6 illustrates a preferred embodiment of the bookmark hierarchical tree structure 600. Structure 600 may be categorized into collections 602–606 and 612 and folders 608. Collections 602–606, 612 may be designated as public collections 604, 612, collections viewable by any user and collections that may appear in searched result set 510. or designated as private collections 602, 606, collections viewable only by the creator.

Upon creating a public collection, the user must identify the collection type either as a "general list" of bookmarks or as a specific topic. An example of a general list identification is "John Smith's Favorite" and example of a specific topic identification is "Computer Gaming Sites". If the user identifies the collection as a general list. the record is stored in rank database 514 and a URL is provided to the user for publishing the collection. Thereafter, other users may access the collection either through a result set returned by search engine 300 or by entering the URL directly into a browser. If the user identifies the collection as a specific topic, the collection must be submitted for approval. The collection is evaluated based on predefined criteria. for example, the number of links in the collection or no empty folders in a collection. Upon approval of the collection, the system prompts the user to enter personal information such as creator's email address and the title, description and keywords associated with the collection. The collection is then stored in collection and rank databases 512, 514 and it is searchable by search engine 300.

The system tracks and ranks each URL based on bookmarking activity performed on the associated web site. Since a score associated with a bookmarked web page is increased each time a user bookmarks the pages, a collection 602–606, 612 may improve search results even though it is designated as a private collection. In other words, a user casts a vote for a web site by bookmarking the site.

Specifically, a bookmark manager application 516 in the system tracks individually bookmarked web pages, assigns scores to associated URL records and maintains the assigned score. Bookmark manager 516 searches rank database 514 and increases the URL record's score each time the associated web page is bookmarked by a user. FIG. 7 illustrates the URL record 700 associated with bookmarked web pages. Record 700 is stored in collection and rank databases 512, 514 and it includes the URL of an associated bookmarked web page 702, a title of the web page 704, and a collection placement 706. Collection placement 706 is used to specify which collections and/or folders, if any contain the bookmark. Record 700 may also include a description of the web page 708 and keywords or phrases 710 that are related to the contents of the web page.

The first time a particular web page is bookmarked by a user, record 700 is transmitted to the rank database 604. If record 700 already exists in database 604, a score associated with it is incremented and if it does not exist. it is inserted into the database and a score is assigned to it. Then the system updates statistical information about the collection. Examples of statistical information include the number of bookmarks in collection 502–506, 512, the number of folders in the collection 502–506, 512, the names of folders that are contained in the root of collection 502–506, 512 and the last update date of collection 502–506, 512.

After record 700 is inserted into 604 rank database, bookmark manager 516 processes any keywords 710 included in record 700 by determining if keyword 710 already exists for that URL in another record. If it does, bookmark manager 516 increments a score associated with that keyword. If it does not exist, bookmark manager 516 assigns a score to the keyword. The top ten keywords 710, keywords with highest scores, are selected and placed in a list where they can be easily searched and associated with the appropriate URLs.

In order to prevent URLs associated with earlier bookmarked pages from having higher scores because of an earlier bookmark date and not necessarily because of relevance to a search topic, bookmark manager 516 periodically, for example once a month, recalculates/rebuilds the score associated with each URL record. Eeach record 700 in rank database 514 includes six additional fields 710–720 for storing six time periods. The first field 712 stores the number of times the associated page was bookmarked since the last rebuild process, the second field 714 stores the number of times the associated page was bookmarked between the last rebuild process and the second last rebuild process and so on. Thus, the sixth field 722 initially stores the number of times between the two earliest rebuild time periods that the associated page was bookmarked. It should be noted that the length of the time between rebuild periods is not as important as consistency between time periods.

Bookmark manager 516 uses the following formula to recalculate the score associated with each URL, record:

$$Score = (P1*3) + (P2*2.5) + (P3*2) + (P4*1.5) + (P5*1) + (P6*0.5)$$

P1 represents the number stored in the first field; P2 represents the number stored in the second field; P3 represents the number stored in the third field; P4 represents the number stored in the fourth field; P5 represents the number stored in the fifth field; and P6 represents the number in the sixth field.

Upon rebuilding URL record's 700 score, bookmark manager 516 sets the value of first field 712 to zero and shifts the value of fields 714–720. Hence, second field's 714 value is set to the previous value of first field 712; third field's 716 value is set to the previous value of second field 714; fourth field's 718 value is set to the previous value of third field 716; and fifth field's 720 value is set to the previous value of fourth field 718. The previous value of fifth field 720 is added to the value of the sixth field 722 and the sixth field 722 is used as an accumulator.

Figure 8:
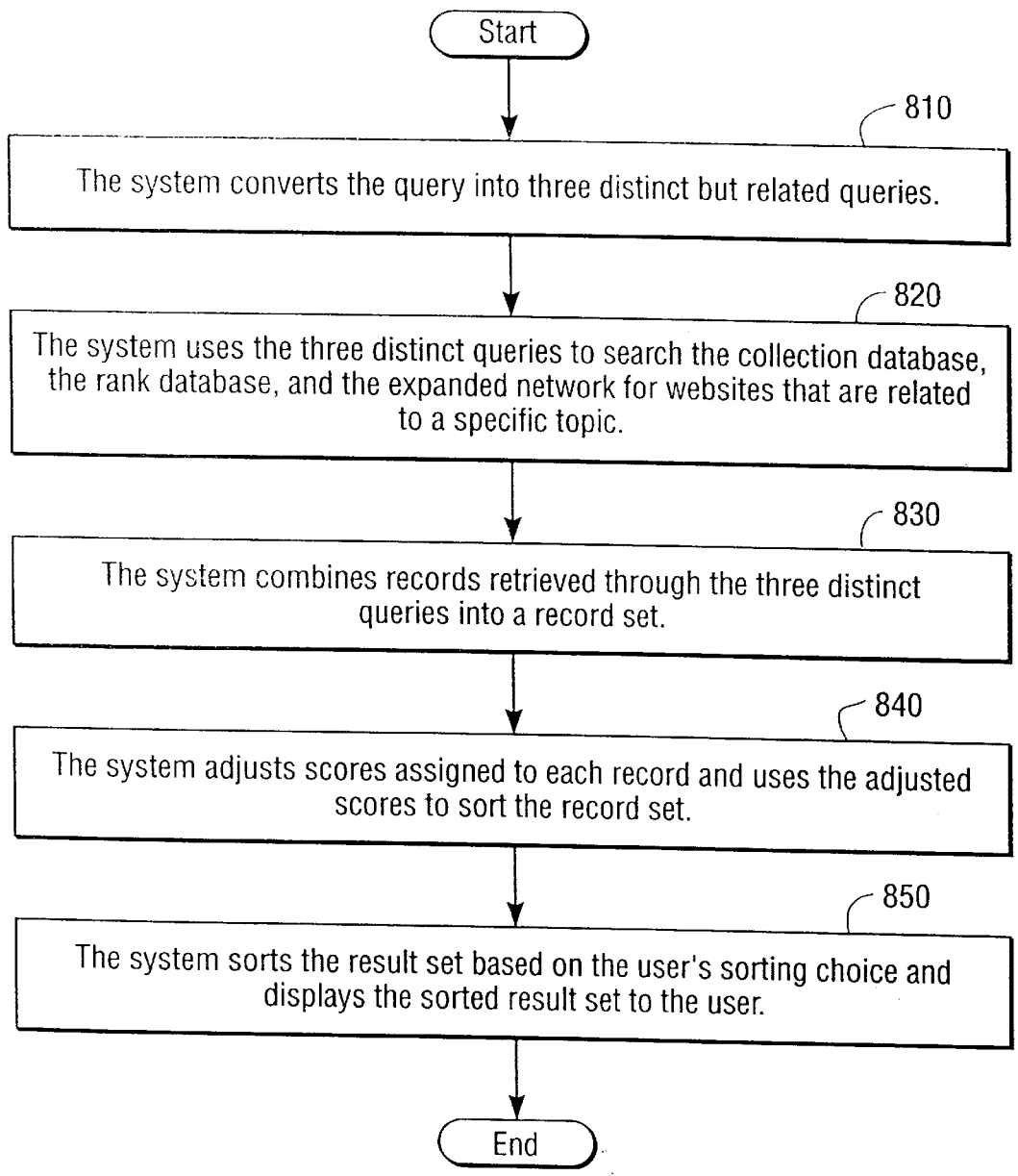
FIG. 8 illustrates a flowchart of how a preferred embodiment of the system processes search queries.

FIG. 8 illustrates a flow chart of how system 300 processes search queries 400 entered by the user according to a preferred embodiment. In Step 810. system 300 converts search query 400 into a phrase match query 504, an all-word query 506 and an any-word query 508 and associates a score with each query. In Step 820, search engine 300 searches collection and rank databases 512–514, and searches all accessible web sites for any sites that satisfy the queries. In Step 830, search engine 300 combines records retrieved from each query 504–508 in a result set. In Step 840, search engine 300 assigns a score to each record in the combined result set and adjusts the assigned score in order further determine the relevance of each record to the search topic. In Step 850, search engine 300 sorts the result set 510 based on the user's sorting choice and displays the sorted result set on a computer screen through a browser.

Figure 9:
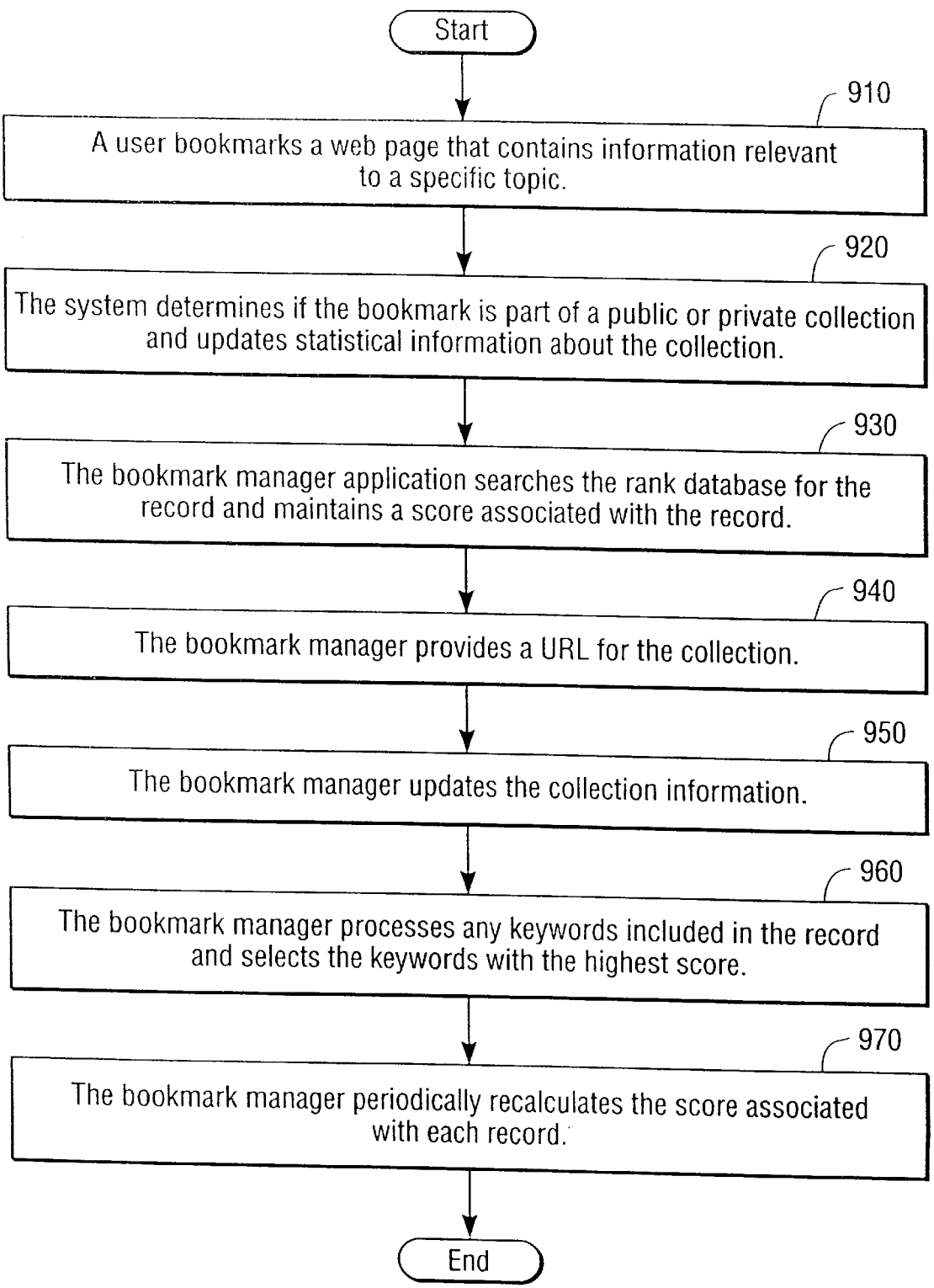
FIG. 9 illustrates a flowchart of how the system tracks and ranks bookmark web pages according to a preferred embodiment of the invention.

FIG. 9 illustrates a flow chart of how the system processes collections and bookmarked web pages in the collection and rank databases 512–514 according to a preferred embodiment of the invention. In Step 910, a user bookmarks a web page that contains information relevant to a specific topic and places the bookmark in a collection. Thereafter the user designates the collection as a public or private collection. In Step 920, search engine 300 determines if the bookmark is part of a collection and if the collection is a public or private collection and it updates statistical information about the collection. In Step 930, the bookmark manager searches rank database 514 for the bookmark and it maintains the score of the associated URL, record 700. If this is the first bookmark of a particular page, URL record 700 is stored in rank database 514 and a score is assigned to record 700, else, the score is incremented. In step 940, the bookmark manager provides a URL for the collection to the user and the user may submit a specific topic-public collection for approval. In Step 950, upon approval of the collection the user updates the collection information for storage in the collection database. In Step 960, the bookmark manager processes any keywords included in URL record 700 and selects the keywords with the highest score. In Step 970, the bookmark manager periodically recalculates the score associated with each record and resets the values of the appropriate fields.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A search system connected to an expanded network, the system comprising:
 a user interface for entering a search query that is submitted to a search engine;
 conversion means in the search engine for converting the search query into a first query, a second query and a third query;

searching means in the search engine for searching the expanded network, a first database and a second database with the first, second and third queries to retrieve web sites and previously selected records that are related to a specific topic, and for retrieving a Uniform Resource Locators (URL) associated with a respective bookmarked web sites;

combining means in the search engine for combining records retrieved from said search in a result set, and for sorting the result set;

wherein the first database comprises collections that are pre-selected from the result set derived from an earlier search, the collection being organized in a predetermined format;

wherein the second database comprises searchable URL records that are associated with bookmarked web sites;

wherein the first query is used for locating records in the expanded network and the first and second databases comprising a phrase containing all terms in the search query, but excluding a first special character or Boolean term;

wherein the second query is used for locating records in the expanded network and the first and second databases comprising all terms in the search query;

wherein the third query is used for locating records in the expanded network and the first and second databases comprising any search term or variation of the search term in the search query;

means for determining if the first, second, and third queries will produce identical results and then using only one of the first, second, and third queries; and means for eliminating duplicate records retrieved through the first, second, and third queries.

2. The system of claim 1, wherein means in the search engine for combining comprises means for assigning a first score, a second score and a third score to the first, second and third queries, respectively, to sort records in the result set that were retrieved through the first, second and third queries.

3. The system of claim 2, further comprising means for adjusting the first, second and third scores.

4. The system of claim 3, wherein means for combining further comprises:
    means for assigning a fourth score to each record in the sorted result set to further determine the relevancy of each record in the result set to the search query; and
    means for increasing the fourth score associated with each record based on a number of times a search term occurs in the record and based on a location of the search term in the record.

5. The system of claim 4, wherein means for combining also comprises means for sorting the result set based on user sorting choice.

6. The system of claim 5, wherein the means for sorting based on the user sorting choice further comprises:
    means for sorting based on the fourth score associated with each record;
    means for sorting based on a creation date of each record;
    means for sorting based on activity level of each record;
    means for sorting based on a rating assigned to each record by other users;
    means for sorting based on the date each record was last updated; and
    means for sorting based on a number of URLs links associated with each record.

7. The system of claim 6, wherein the system further comprises means for enabling a user to bookmark a web page, with contents related to a specific topic, in the result set.

8. The system of claim 7, wherein a URL record associated with the bookmarked web page is organized into a hierarchical tree structure that comprises collections and/or folders.

9. The system of claim 8 wherein the collection may be designated a public collection.

10. The system of claim 9, wherein the collection may be designated as a private collection.

11. The system of claim 10, wherein the public collection is searchable by the search engine and viewable by other users.

12. The system of claim 11, wherein the private collection is viewable only by the collection's creator.

13. The system of claim 12, further comprising a software component for tracking and ranking a URL record, associated with the bookmark web page, based on bookmarking activity on the associated web site.

14. The system of claim 13, wherein the software component further comprises means for updating statistical information about each collection.

15. The system of claim 14, further comprising means for designating the public collection as a first type or second type;
    means for storing the first type public collection in the second database and providing a URL that is associated with the first type public collection;
    means for submitting the second type public collection for approval;
    means for evaluating the second type public collection and upon approval prompting the user for information associated with the second type public information; and
    means for storing the second type public collection in the first and second databases.

16. A method for searching an expanded network for information related to a specific topic, the method comprising the steps of:
    entering a search query in a user interface for submission to an associated search engine;
    converting the search query into a first query, a second query and a third query;
    searching the expanded network, a first database and second databases with the first, second and third queries to retrieve previously selected records or previously selected URL associated with a bookmarked web site;
    combining results retrieved from the step of searching in a result set, and sorting the result set;
    storing collections in the first database;
    storing records corresponding to bookmarked web sites in the second database;
    locating through the first query, records comprising a phrase containing all terms in the search query, but excluding a first special character or Boolean term;
    locating through the second query, records comprising all terms in the search query;
    locating through the third query, records comprising any search term or variation of the search terms in the search query;
    determining if the first, second and third queries will produce identical results and then using only one of the first, second and third queries; and eliminating duplicate records retrieved through the first, second and third queries.

17. The method of claim 16, wherein the step of searching further comprising the steps of assigning a first score, a second score and a third score to the first, second and third queries respectively in order to sort records in the result set that were retrieved through the first, second an third queries; and maintaining the first, second and third scores.

18. The method of claim 17, wherein the step of combining further comprising the step of assigning a fourth score to each record in the sorted result set in order to further determine a relevancy of each record to the search query.

19. The method of claim 18, wherein the step of combining further comprising the step of increasing the fourth score associated with each record based on the number of times a search term occurs in the record and based a the location of the search term in the record.

20. The method of claim 19, wherein the step of searching further comprising a step of sorting the result set based on user sorting choice.

21. The method of claim 20, wherein the step of sorting comprising steps of:

sorting based on the fourth score associated with each record:

sorting based on a creation date of each record;

sorting based on activity level of each record;

sorting based on a rating assigned to each record by other users;

sorting based on the date each record was last updated; and sorting based on a number of URLs links associated with each record.

22. The method of claim 21, comprising the step of bookmarking a web page having contents related to a specific topic in the result set and associating a record with the bookmarked web page.

23. The method of claim 22, further comprising the step of organizing the record associated with the bookmarked web page into a hierarchical tree structure that comprises collections and/or folders.

24. The system of claim 23, further comprising the step of designating the collection as a public or private collection.

25. The method of claim 24, wherein the step of designating further comprising the step of:

identifying the public collection as a first type or second type;

storing the first type public collection in the second database and providing a URL that is associated with the first type public collection;

submitting the second type public collection for approval;

evaluating the second type public collection and upon approval prompting the user for information associated with the second type public information; and storing the second type public information in the first and second databases.

26. The method of claim 25, further comprising the step of searching and viewing the public collection by other users.

27. The method of claim 26, further comprising the step of viewing and searching the private collection only by the collection's creator.

28. The system of claim 27, further comprising the step of tracking and ranking records associated with bookmarked web pages based on activity on the associated web pages.

* * * * *